(12) United States Patent
Hubert (10) Patent No.: US 11,180,354 B2
(45) Date of Patent: Nov. 23, 2021

(54) CHERRY PICKER FOR ELEVATING PERSONS AND ALLOWING SAID PERSONS TO WORK IN AN ELEVATED POSITION

(71) Applicant: MANITOU BF, Ancenis (FR)

(72) Inventor: Fabrice Hubert, Ancenis (FR)

(73) Assignee: MANITOU BF, Ancenis (FR)

( * ) Notice: Subject to any disclaimer, the term of this patent is extended or adjusted under 35 U.S.C. 154(b) by 0 days.

(21) Appl. No.: 16/965,508

(22) PCT Filed: Feb. 15, 2019

(86) PCT No.: PCT/FR2019/050338
§ 371 (c)(1),
(2) Date: Jul. 28, 2020

(87) PCT Pub. No.: WO2019/158869
PCT Pub. Date: Aug. 22, 2019

(65) Prior Publication Data
US 2021/0078844 A1 Mar. 18, 2021

(30) Foreign Application Priority Data
Feb. 16, 2018 (FR) ........................................ 1851340

(51) Int. Cl.
*F02N 11/08* (2006.01)
*B66F 9/24* (2006.01)
*B66F 11/04* (2006.01)

(52) U.S. Cl.
CPC .............. *B66F 9/24* (2013.01); *B66F 11/044* (2013.01); *F02N 11/0803* (2013.01); *F02N 11/0825* (2013.01); *F02N 2200/061* (2013.01)

(58) Field of Classification Search
CPC ...... B66F 9/24; B66F 11/044; F02N 11/0803; F02N 11/0825; F02N 2200/061; Y02T 10/40

(Continued)

(56) References Cited

U.S. PATENT DOCUMENTS

| 4,762,199 A * | 8/1988 | Holmes ................. B66F 11/044 |
| | | 182/148 |
| 6,789,519 B1 * | 9/2004 | Bell ...................... B66F 11/044 |
| | | 123/179.2 |
| 10,448,628 B2 * | 10/2019 | Brooks ............... F02N 11/0803 |

FOREIGN PATENT DOCUMENTS

| CN | 105 804 875 | 7/2016 |
| EP | 1 520 832 | 4/2005 |
| JP | H04 121999 | 10/1992 |

OTHER PUBLICATIONS

International Search Report dated Jan. 24, 2019.
Search Report dated Jan. 29, 2019.

* cited by examiner

*Primary Examiner* — Hai H Huynh
(74) *Attorney, Agent, or Firm* — Ipsilon USA, LLP (57) ABSTRACT

Disclosed is a cherry picker (1) comprising a chassis (2), a heat engine (4), a starter (5) and a starter actuator (62) for said engine (4), a platform (8), means (9) for lifting the platform (8) that include a lifting arm (91), a control console (10) that includes a control unit (26) for the lifting means (9), a drive unit configured to control at least the arm (91) according to the data input into the control console (10), a member for powering the drive unit (11), a member (12) for activating/deactivating the control unit (26) for the lifting means (9), said member (12) being mounted to as to be movable between an inactive position, in which the control unit (9) for the lifting means (9) is deactivated, and an active position. In the working configuration, which corresponds to the raised position of the arm (91), the cherry picker (1) has an operating mode in which, when the heat engine (4) is in a stopped state while being powered, the drive unit (11) is configured to control the start of the heat engine (4) by (Continued)

means of the activating/deactivating member (12) without the actuator (62) for the starter (5) being actuated.

15 Claims, 8 Drawing Sheets

(58) Field of Classification Search
USPC .............................. 123/179.2, 179.3, 179.4
See application file for complete search history.

CHERRY PICKER FOR ELEVATING PERSONS AND ALLOWING SAID PERSONS TO WORK IN AN ELEVATED POSITION

RELATED APPLICATION

This application is a National Phase of PCT/FR2019/050338 filed on Feb. 15, 2019, which claims priority to French Patent Application No. FR 18 51340 filed on Feb. 16, 2018, the entirety of which are incorporated by reference.

FIELD OF THE INVENTION

The invention relates to a cherry picker for elevating persons and allowing said persons to work in an elevated position.

It relates more particularly to a cherry picker comprising:
a chassis,
an internal combustion engine, a starter for said internal combustion engine and at least one member for actuating the starter,
a platform,
means for elevating the platform relative to the chassis, said elevation means comprising at least one telescopic or non-telescopic lifting arm arranged between a zone for connection to the platform and the chassis and mounted so that it can be moved between a raised position and a lowered position,
a control panel held by said platform and provided at least with a control for the elevation means, and
a drive unit configured to control the elevation means as a function at least of the data supplied by said control panel,
a member for powering up at least the drive unit, said power-up member being capable of switching from an inactive state to an active state, and vice versa,
a member for activating/deactivating at least the control for the elevation means, said activation/deactivation member being mounted so that it can be moved between an inactive position in which the control for the elevation means is deactivated, i.e. inactive, regardless of whether the internal combustion engine is switched off or on, and an active position in which the control for the elevation means is activated, i.e. active, said activation/deactivation member being provided with means for returning it to an inactive position and being capable of switching from the inactive position to the active position under the action of thrust exerted on said member against the return means,
said cherry picker having two configurations, namely a transport configuration and a working configuration, said cherry picker being in transport configuration in the lowered position of the arm and in the retracted position of the arm in the case of a telescopic arm.

PRIOR ART

A cherry picker of the aforementioned type is known, provided in particular with a dead-man's handle, as illustrated by EP 1520832. Hitherto, in such a cherry picker, in working configuration, the internal combustion engine is idling while the operator carries out their tasks. This results in premature wear of the engine and significant fuel consumption. Solutions are therefore being sought to reduce the wear of the internal combustion engine. A cherry picker provided with a remote control device for automatically switching the engine on/off as a function of a number of conditions is known, as illustrated by CN 105804875. In this document, the engine is switched off automatically in the absence of actuation of the elevation means. The details of this control for automatically switching off or restarting the engine are not provided. The same applies to Japanese document H04121999. The operator is disinclined to work with the internal combustion engine switched off as they know that the restarting operation is tedious. It makes it necessary to act on the starter actuation member arranged on the control panel, then on the member for activating/deactivating the controls of the control panel in order to be able to control the movement of the cherry picker. It also sometimes makes it necessary to wait a few moments while the hydraulic pump associated with the internal combustion engine and used to supply the hydraulic circuit of the lifting arm actuators has reached a sufficient speed to enable the performance of the desired actions on the basis of the controls from the control panel. Solutions are therefore being sought to avoid the drawbacks mentioned above.

OBJECT AND SUMMARY

One object of the invention is to propose a cherry picker the design of which makes it possible to reduce energy consumption without detracting from the performance of the platform elevation means.

One object of the invention is to propose a cherry picker the design of which makes it possible, in the working configuration, to start the internal combustion engine easily without a tedious procedure.

Another object of the invention is to propose a cherry picker the design of which makes it possible, in the working configuration, to start the internal combustion engine as a background task, i.e. when the operator is using their hands to carry out the task to be performed at a height.

To this end, the invention relates to a cherry picker comprising:
a chassis,
an internal combustion engine, a starter for said internal combustion engine and at least one member for actuating the starter,
a platform,
means for elevating the platform relative to the chassis, said elevation means comprising at least one telescopic or non-telescopic lifting arm arranged between a zone for connection to the platform and the chassis and mounted so that it can be moved by means of the internal combustion engine between a raised position and a lowered position,
a control panel held by said platform and provided at least with a control for the elevation means, and
a drive unit configured to control the elevation means as a function at least of the data supplied by said control panel,
a member for powering up at least the drive unit, said power-up member being capable of switching from an inactive state to an active state and vice versa,
a member for activating/deactivating at least the control for the elevation means, said activation/deactivation member being mounted so that it can be moved between an inactive position in which at least the control for the elevation means is deactivated regardless of whether the internal combustion engine is switched off or on, and an active position in which at least the control for the elevation means is activated, said activation/deactivation member being provided with means for returning it to an inactive position and being capable of switching from the inactive position to the active position under the action of thrust exerted on said activation/deactivation member against the return means, said cherry picker having two configurations, namely a transport configuration and a working configuration, said cherry picker being in transport configuration in the lowered position of the arm and in the retracted position of the arm in the case of a telescopic arm, characterized in that in the working configuration, the cherry picker comprises at least one operating mode in which the internal combustion engine is capable, in the activated state of the member for powering up the drive unit, and in the started state of the internal combustion engine, of being switched off, this switching off of the internal combustion engine being known as a powered switch-off of the internal combustion engine, and in which, in the powered switched-off state of said internal combustion engine, the drive unit is configured to control the starting of the internal combustion engine by means of the member for activating/deactivating at least the control for the elevation means, by switching the activation/deactivation member from the inactive position to the active position, without actuation of the member or members for actuating the starter.

The cherry picker therefore comprises a so-called economical operating mode in which the drive unit is configured to cause a powered switch-off of the internal combustion engine, i.e. a switch-off of the internal combustion engine in the activated state of the member for powering up the drive unit, and to start the internal combustion engine when an action by the driver, or operator, interpreted as a starting request is detected, this action corresponding, in the present invention, to the actuation of the activation/deactivation member of at least the control for the platform elevation means on the control panel in order to activate said member, i.e. to switch said activation/deactivation member from the inactive position to the active position without actuation of the member or members for actuating the starter, these members for actuating the starter generally consisting of a starting button that makes it possible to send an electrical signal to the electric starter. The member for activating/deactivating at least the control for the platform elevation means on the control panel is held by the platform.

The operating mode described above results in the activation of at least the control for the platform elevation means in parallel with the starting of the internal combustion engine and the possibility for the operator to continue working when they have initiated the starting of said internal combustion engine, this starting taking place as a background task.

It also results in the optimization of the performance of the elevation means, this improved performance resulting from the early starting of the internal combustion engine enabling the preparation of the elevation means for operation.

According to one embodiment of the invention, the starter of the internal combustion engine being powered by a battery capable of being recharged when the internal combustion engine is running, the cherry picker comprises a charge level indicator of the battery and, in the working configuration of the cherry picker, the cherry picker comprises an operating mode in which said drive unit is configured, in the powered switched-off state of the internal combustion engine, to control the automatic starting of the internal combustion engine at least as a function of the data supplied by the charge level indicator.

The operating mode or one of the operating modes in which said drive unit is configured, in the powered switched-off state of the internal combustion engine, to control the automatic starting of the internal combustion engine at least as a function of the data supplied by the charge level indicator, is at least the operating mode known as the economical operating mode in which, in the powered switched-off state of said internal combustion engine, the drive unit is capable of controlling the starting of the internal combustion engine by means of the activation/deactivation member, by switching said activation/deactivation member from the inactive position to the active position.

The possibility of automatic starting of the internal combustion engine as a function of the charge level, and in particular the automatic starting of the internal combustion engine when the charge level is below a predetermined threshold, makes it possible to prevent the operator from finding themselves, in the working configuration of the cherry picker, in a situation in which, in the switched-off state of the internal combustion engine, the internal combustion engine can no longer be started due to a lack of battery power. This automatic starting of the internal combustion engine thus ensures that the battery is recharged when necessary.

In the working configuration of the cherry picker, in this economical operating mode, the drive unit is also configured, in the started state of the internal combustion engine, to control the powered switching off of the internal combustion engine at least as a function of the data supplied by the charge level indicator.

According to one embodiment of the invention, the operating mode known as the economical operating mode in which, in the powered switched-off state of the internal combustion engine, the drive unit is capable of controlling the starting of the internal combustion engine by means of the activation/deactivation member, by switching said activation/deactivation member from the inactive position to the active position, the drive unit is also configured, in the powered switched-off state of the internal combustion engine, to control the automatic starting of the internal combustion engine at least as a function of the data supplied by the charge level indicator, this economical operating mode being a mode that can be activated/deactivated, and the drive unit being configured to deactivate the economical operating mode at least as a function of the data supplied by the charge level indicator.

The possibility of causing the powered switching off of the internal combustion engine and then starting said internal combustion engine either automatically or when a restarting request via the member for activating/deactivating at least the control for the platform elevation means is detected, in the same operating mode, gives the operator greater flexibility during work while working safely and at a lower cost. The powered switching off of the engine also enables the operator to work in complete safety and reduces fuel consumption over the prior art.

According to one embodiment of the invention, the cherry picker comprises an indicator of the active/inactive position of the member for activating/deactivating at least the control for the elevation means and, in the working configuration of the cherry picker, in the so-called economical operating mode in which, in the powered switched-off state of said internal combustion engine, the activation/deactivation member is capable, by switching from the inactive position to the active position, of controlling the starting of the internal combustion engine, the drive unit is configured to control the powered switching off of the internal combustion engine at least as a function of the data supplied by said position indicator. In particular, the drive unit is configured to control the powered switching off of the internal combustion engine at least if the inactive position of the activation/deactivation member of at least the control for the platform elevation means is detected.

In the working configuration of the cherry picker and in the so-called economical operating mode, the fact that the drive unit only causes the powered switching off of the engine if at least the inactive position of the member for activating/deactivating at least the control for the platform elevation means is detected enables the drive unit to control the subsequent starting of the internal combustion engine by means of said activation/deactivation means, when said member switches from the inactive position to the active position.

According to one embodiment of the invention, the drive unit comprises a presence determination module configured to determine the present or absent state of a person on the platform as a function of data supplied by the control panel and, in the working configuration of the cherry picker, in the operating mode in which, in the powered switched-off state of said internal combustion engine, the activation/deactivation member is capable, by switching from the inactive position to the active position, of controlling the starting of the internal combustion engine, the drive unit is configured to control the powered switching off of the internal combustion engine at least as a function of said state determined by the presence determination module. In the working configuration of the cherry picker and in the so-called economical operating mode, the fact that the drive unit only causes the powered switching off of the internal combustion engine if the presence of a person is detected in the cherry picker makes it possible to prevent the internal combustion engine switching off in the absence of a person in the cherry picker.

According to one embodiment of the invention, the cherry picker comprises a member that can be activated/deactivated for controlling the cold starting of the internal combustion engine and a module for determining the activated/deactivated state of said control member, this control member being able to be activated by manual actuation and deactivated automatically and, in the working configuration of the cherry picker, in the operating mode in which, in the powered switched-off state of said internal combustion engine, the member for activating/deactivating at least the control for the elevation means is capable, by switching from the inactive position to the active position, of controlling the starting of the internal combustion engine, the drive unit is configured to control the powered switching off of the internal combustion engine at least as a function of the activated/deactivated state of said cold start control member determined by said module. In the working configuration of the cherry picker and in the so-called economical operating mode, the fact that the drive unit only causes the powered switching off of the internal combustion engine if at least the cold start control member is deactivated, enables a subsequent warm starting of the internal combustion engine, which facilitates starting and reduces the risks of premature wear of the mechanism, as warm oil tends to lubricate the mechanical parts more easily.

According to one embodiment of the invention, the cherry picker comprises at least one electricity generator, and a module for determining the activated/deactivated state of said electricity generator and, in the working configuration of the cherry picker, in the operating mode in which, in the powered switched-off state of said internal combustion engine, the activation/deactivation member is capable, by switching from the inactive position to the active position, of controlling the starting of the internal combustion engine, the drive unit is configured to control the powered switching off of the internal combustion engine at least as a function of the activated/deactivated state of the electricity generator determined by said module. In the working configuration of the cherry picker and in the so-called economical operating mode, the fact that the drive unit only causes the powered switching off of the internal combustion engine if at least the electricity generator such as an electric motor driven by the internal combustion engine is deactivated, makes it possible to prevent the switching off of the internal combustion engine when electricity production by means of the electricity generator is necessary for the satisfactory operation of the cherry picker.

According to one embodiment of the invention, the cherry picker comprises a protective cover for the internal combustion engine held by the chassis and a detector for detecting the open/closed state of the cover and, in the working configuration of the cherry picker, in the operating mode in which, in the powered switched-off state of said internal combustion engine, the activation/deactivation member is capable, by switching from the inactive position to the active position, of controlling the starting of the internal combustion engine, the drive unit is configured to control the starting of the internal combustion engine at least as a function of the open/closed state of the cover. The fact that the drive unit makes the starting of the internal combustion engine dependent on the closed state of the cover, whether such starting takes place automatically or by means of said activation/deactivation member, makes it possible to avoid any risk of injury to an operator who has remained on the ground and is positioned close to the internal combustion engine.

According to one embodiment of the invention, the cherry picker comprises means for transmitting an audible and/or light signal and, in the working configuration of the cherry picker, in the operating mode in which, in the powered switched-off state of said internal combustion engine, the activation/deactivation member is capable, by switching from the inactive position to the active position, of controlling the starting of the internal combustion engine, the drive unit is configured to control the actuation of the transmission means in the powered switched-off state of said internal combustion engine. The presence of audible and/or light signal transmission means makes it possible to indicate to the operator that the cherry picker is in an economical operating mode.

According to one embodiment of the invention, said activation/deactivation member is a foot pedal held by said platform. Producing the activation/deactivation member of at least the control for the platform elevation means in the form of a foot-operated pedal enables the operator to have their hands free and therefore to continue to work while they control the starting of the internal combustion engine. This further results in an additional time saving in terms of starting as the operator can work in the background during the engine starting step.

According to one embodiment of the invention, the member for powering up the cherry picker is a key arranged on the chassis, this key being a turning key capable of switching by turning from an inactive state to an active state, and vice versa.

According to one embodiment of the invention, in the operating mode known as the economical operating mode in which, in the powered switched-off state of said internal combustion engine, the drive unit is capable of controlling the starting of the internal combustion engine by means of the member for activating/deactivating at least the control for the elevation means, by switching the activation/deactivation member from the inactive position to the active position, without actuation of the member or members for actuating the starter, the drive unit is configured, in the started state of the internal combustion engine, to control the powered switching off of the internal combustion engine at least if the member for activating/deactivating at least the control for the elevation means is in the inactive position.

In short, in the working configuration, the cherry picker comprises at least one operating mode in which the internal combustion engine is capable, in the activated state of the member for powering up the drive unit, and in the started state of the internal combustion engine, of being switched off, this switching off of the internal combustion engine being known as the powered switching off of the internal combustion engine, and in this so-called economical operating mode, in the powered switched-off state of said internal combustion engine, the drive unit is configured to control the starting of the internal combustion engine by means of the member for activating/deactivating at least the control for the elevation means, by switching the activation/deactivation member from the inactive position to the active position, without actuation of the member or members for actuating the starter and, in the started state of the internal combustion engine, the drive unit is configured to control the powered switching off of the internal combustion engine at least if the member for activating/deactivating at least the control for the elevation means is in the inactive position.

According to one embodiment of the invention, the cherry picker is provided with at least one sensor representing the position of the arm in order to detect the working configuration of the cherry picker.

According to one embodiment of the invention, the chassis is provided with a control station and the or one of the members for actuating the starter consists of a starting button provided on said station.

According to one embodiment of the invention, the chassis being provided with wheels, the internal combustion engine is connected to the wheels by means of a transmission in order to form means for moving the chassis over the ground;

and the control panel held by said platform is also provided at least with a control for the means for moving the chassis over the ground, and the drive unit is also configured to control the means for moving the chassis over the ground as a function at least of the data supplied by said control panel, and said activation/deactivation member is also configured, in the active position, to activate the control for the means for moving the chassis over the ground, and in the inactive position, to deactivate the control for the means for moving the chassis over the ground.

A further object of the invention is a method for controlling a cherry picker comprising:
a chassis,
an internal combustion engine, a starter for said internal combustion engine and at least one member for actuating the starter,
a platform,
means for elevating the platform relative to the chassis, said elevation means comprising at least one telescopic or non-telescopic lifting arm arranged between a zone for connection to the platform and the chassis and mounted so that it can be moved by means of the internal combustion engine between a raised position and a lowered position,
a control panel held by said platform and provided at least with a control for the elevation means, and
a drive unit configured to control the elevation means as a function at least of the data supplied by said control panel,
a member for powering up at least the drive unit, said power-up member being capable of switching from an inactive state to an active state and vice versa,
a member for activating/deactivating at least the control for the elevation means, said activation/deactivation member being mounted so that it can be moved between an inactive position in which the control for the elevation means is deactivated regardless of whether the internal combustion engine is switched off or on, and an active position in which the control for the elevation means is activated, said activation/deactivation member being provided with means for returning it to an inactive position and being capable of switching from the inactive position to the active position under the action of thrust exerted on said activation/deactivation member against the return means,
said cherry picker having two configurations, namely a transport configuration and a working configuration, said cherry picker being in transport configuration in the lowered position of the arm and in the retracted position of the arm in the case of a telescopic arm, characterized in that in the working configuration of the cherry picker, in at least one operating mode in which the internal combustion engine is capable, in the activated state of the member for powering up the drive unit, and in the started state of the internal combustion engine, of being switched off, this switching off of the internal combustion engine being known as a powered switch-off of the internal combustion engine, the method comprises a step of starting the internal combustion engine by means of the member for activating/deactivating at least the control for the elevation means, by switching the activation/deactivation member from the inactive position to the active position, without actuation of the member or members for actuating the starter.

BRIEF DESCRIPTION OF THE DRAWINGS

The invention will be clearly understood on reading the following description of embodiments, with reference to the attached drawings, in which.

DETAILED DESCRIPTION

As mentioned above, the invention relates to a cherry picker 1 enabling people to work at height. This cherry picker 1 comprises a rolling chassis 2.

The cherry picker 1 comprises an internal combustion engine 4, an electric starter 5 for said internal combustion engine 4 and at least one member 61, 62 for actuating the starter 5.

In the example shown, the chassis 2 is provided with four wheels 33, two of which are generally drive wheels.

The cherry picker comprises means 3 for moving the chassis 2 over the surface of the ground by means of the wheels 33. According to one particular aspect, the internal combustion engine 4 is connected to the wheels by means of a transmission 25 in order to form the means 3 for moving the chassis 2 over the ground. Provision can also be made for the electric starter 5 for said internal combustion engine 4 and optionally said at least one means 61, 62 for actuating the starter 5 to form part of these movement means 3.

The internal combustion engine 4 is thus connected to the wheels 33 by a transmission 25, preferably hydrostatic, that here comprises a hydrostatic pump and hydraulic motors each associated with one so-called drive wheel 33. This transmission will not be described in detail as such a transmission is well known to a person skilled in the art.

An electricity generator 20, such as an electric motor, can be associated with the internal combustion engine 4 and a module 21 for determining the activated state of the generator can be provided on the drive unit 11, which will be described below.

The internal combustion engine 4 is capable of being protected by a cover 28 held by the chassis 2. This cover 28 is mounted so that it can be moved between an open position and a closed position and is provided with a detector 29 for detecting the open or closed state of the cover consisting, for example, of a switch or position sensor capable of providing position data information to the drive unit 11, which will be described below.

The electric starter 5 for the internal combustion engine 4 is powered by a battery 15 capable of being recharged when the internal combustion engine 4 is running. A charge level indicator 16 of the battery 15 is provided. This charge level indicator 16 can consist of a member, such as a sensor, for measuring the charge level, i.e. a charge or discharge characteristic or a voltage at the battery terminals. This measurement information can be sent to the drive unit 11 described below. As a variant, this charge level indicator 16 of the battery 15 can consist of a module integrated into the drive unit.

In the example shown, the starter 5 for the internal combustion engine 4 can be actuated, in order to start the internal combustion engine 4, by means of two actuation members 61, 62 that both take the form of a button that sends an electrical signal to the starter when pressed. The position of these actuation members will be described below.

The cherry picker 1 further comprises a platform 8 on which the operator wishing to work at height can be positioned. This platform 8, which comprises a floor and a guard rail surrounding the floor, is provided with a control panel 10 provided with control(s) 26 in a manner known per se. The details of this control panel 10 will be given below.

The cherry picker 1 further comprises means 9 for elevating the platform 8 relative to the chassis 2. These elevation means 9 comprise a lifting arm 91 arranged between a zone 30 for connection to the platform 8 and the chassis 2. This lifting arm 91 can consist of one or more arm sections articulated with respect to each other as in the example shown. This arm can be a telescopic or non-telescopic arm.

In order to switch the arm from the lowered position to the raised position, the cherry picker comprises a hydraulic pump 23 coupled to the internal combustion engine 4 and hydraulic actuators, in this case cylinders 22 arranged between the arm and the chassis, and between the arm sections when the arm is in different sections.

These cylinders 22 are supplied with hydraulic fluid by means of the hydraulic pump 23 via a hydraulic spool valve 24 the movement of which is controlled by means of signals supplied from said drive unit 11 described below.

Sensors 32 can be arranged on the cylinders and make it possible to identify the position of the cylinder piston and consequently the raised or lowered position of the lifting arm 91. These sensors 32 can further be arranged on each limit stop provided on the arm and representing the lowered position of the arm. The data from these position sensors 32 representing the position of the arm can be sent to the drive unit 11, which will be described below.

Figure 1:
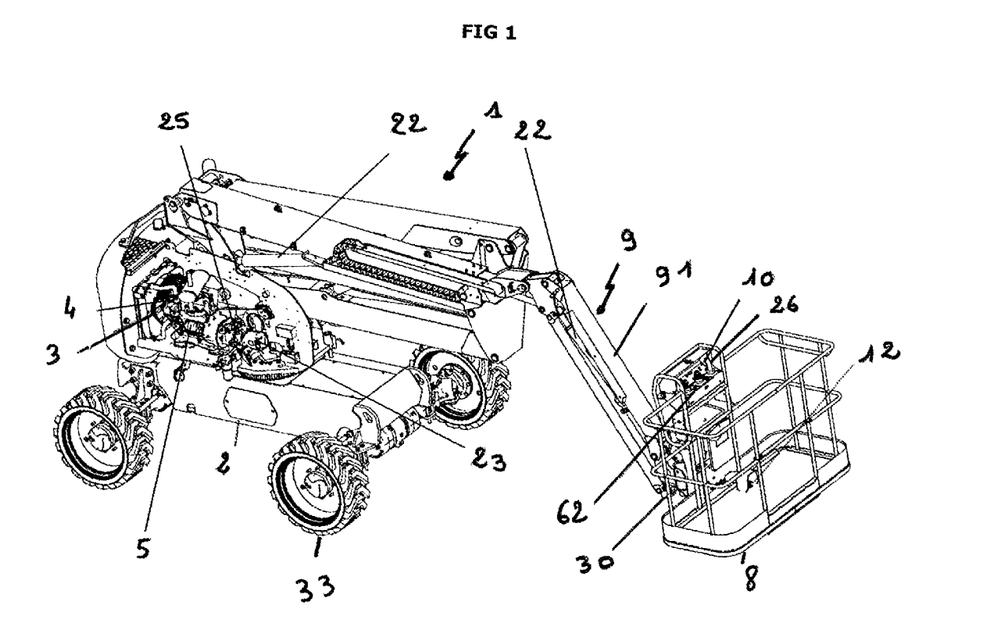
FIG. 1 shows a perspective view of a cherry picker according to the invention in the transport configuration, with some of the elements of the body removed to show the inside of the cherry picker.
Figure 2:
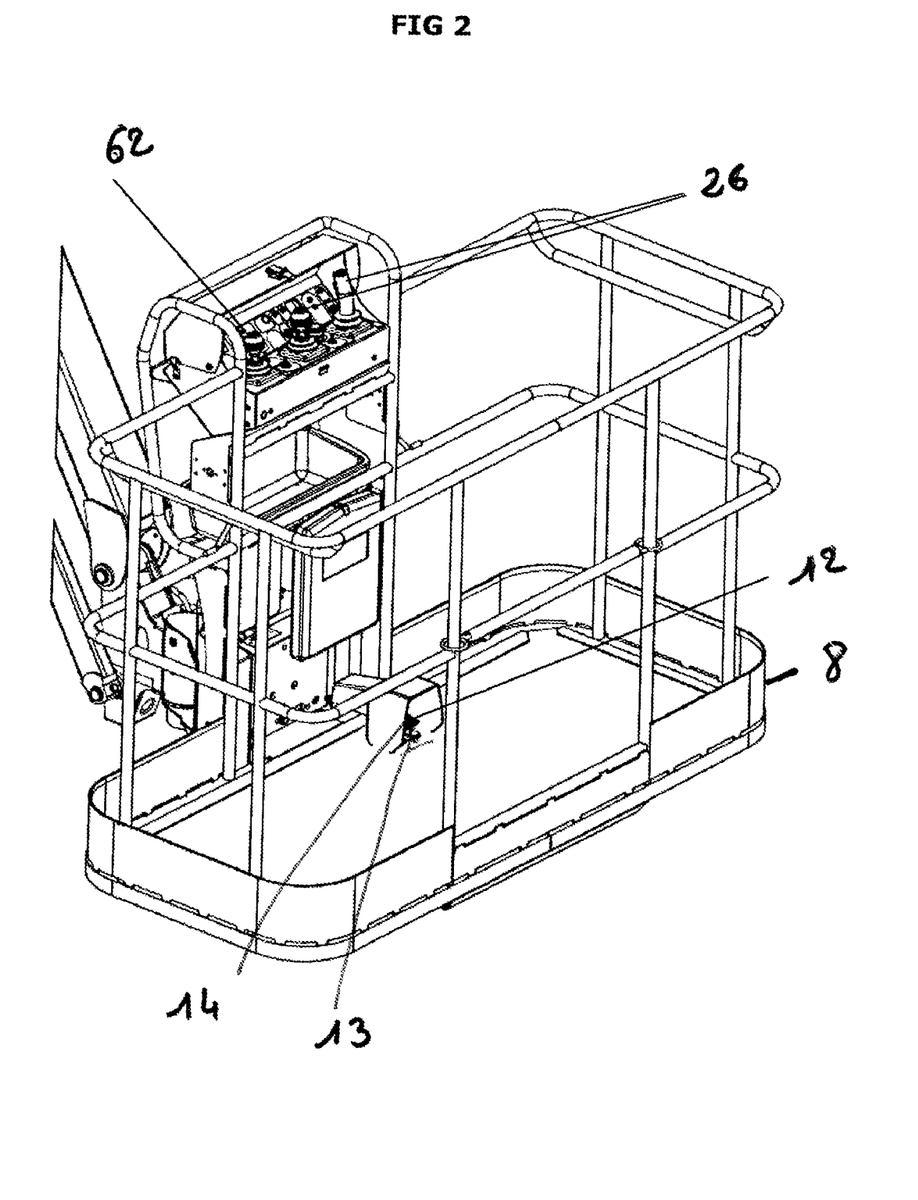
FIG. 2 shows a perspective view of a platform of a cherry picker according to the invention.
Figure 3:
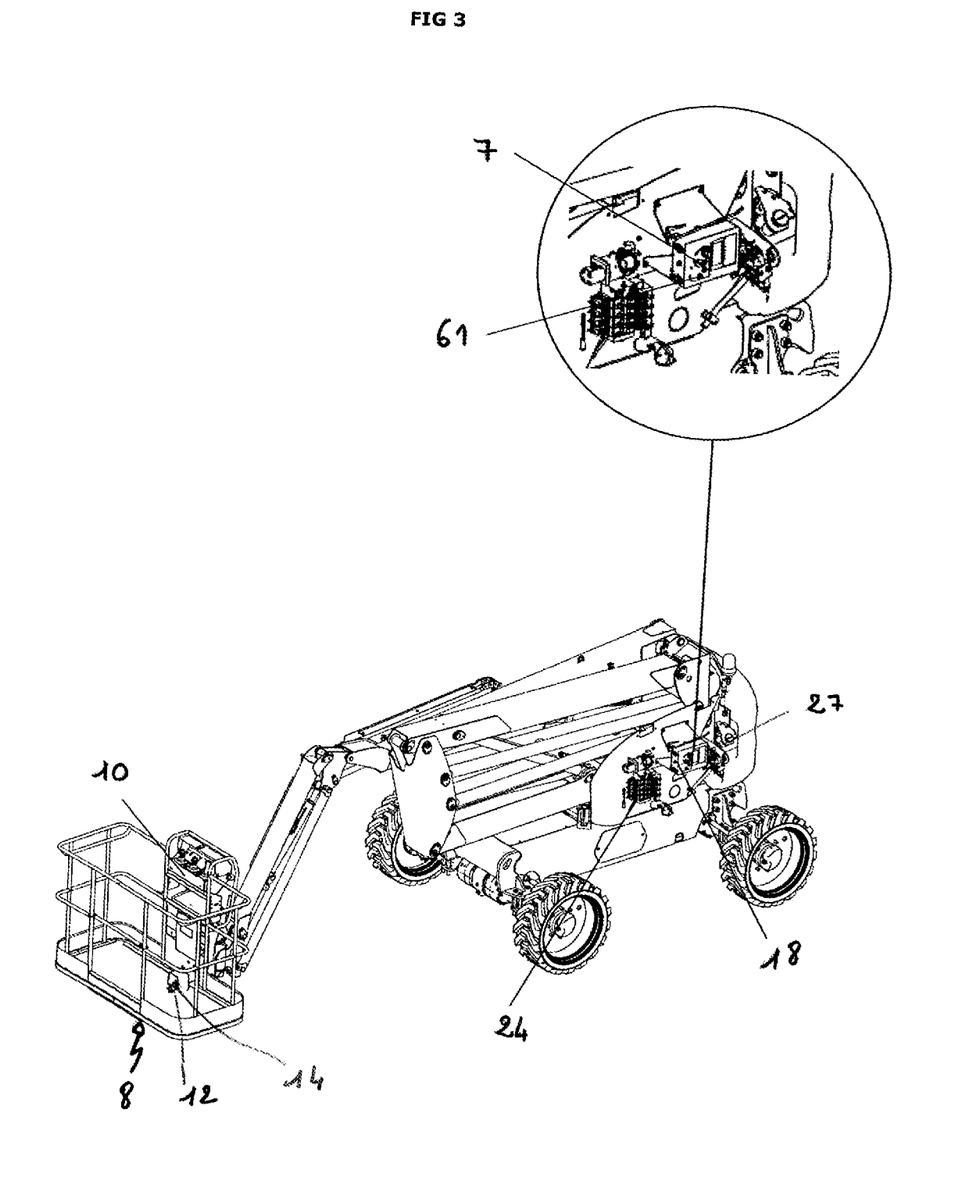
FIG. 3 shows a perspective view of a cherry picker according to the invention in the transport configuration, with a detailed view of the control station provided on the chassis.
Figure 4:
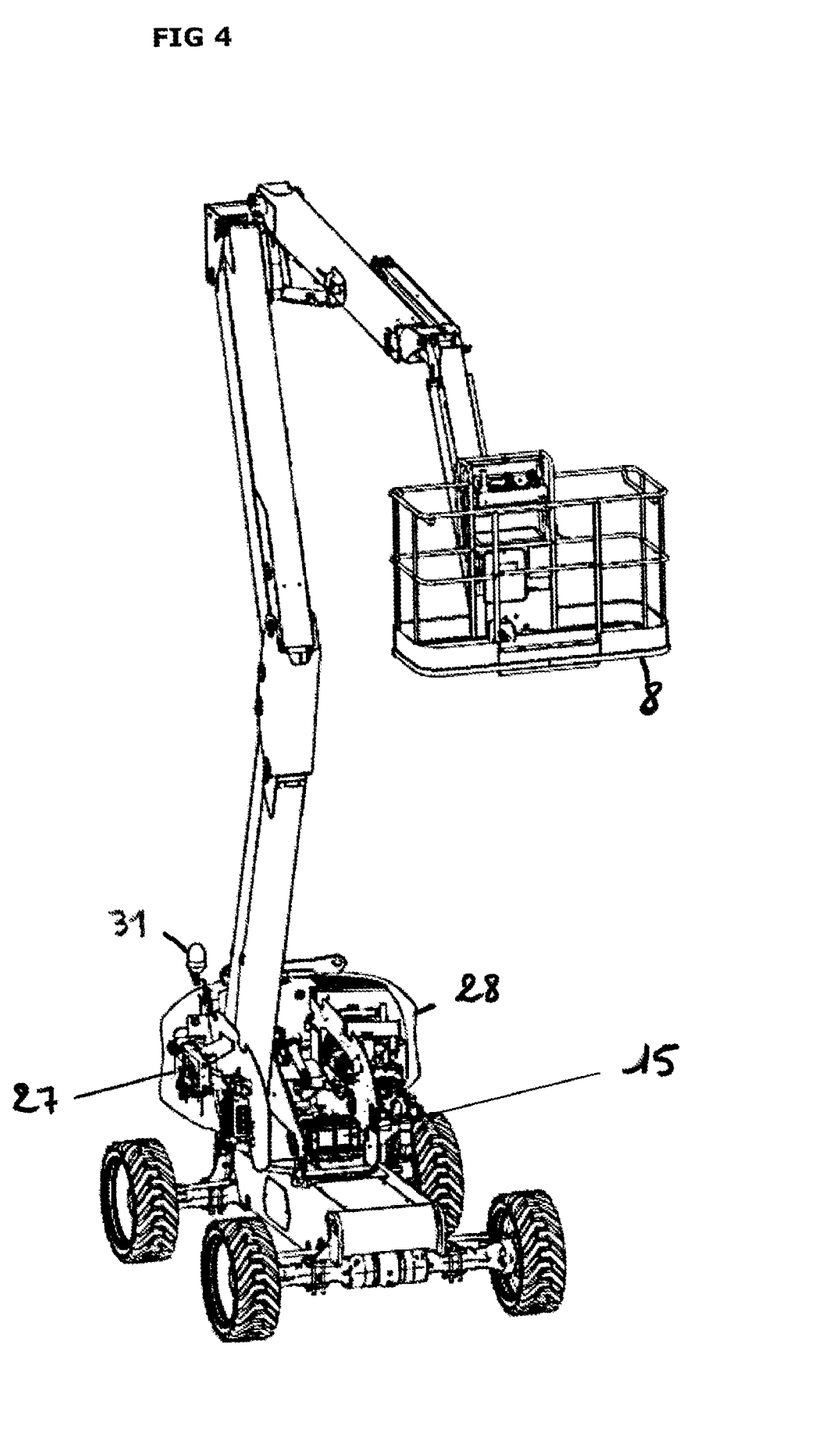
FIG. 4 shows a perspective view of a cherry picker according to the invention in the working configuration.
Figure 5:
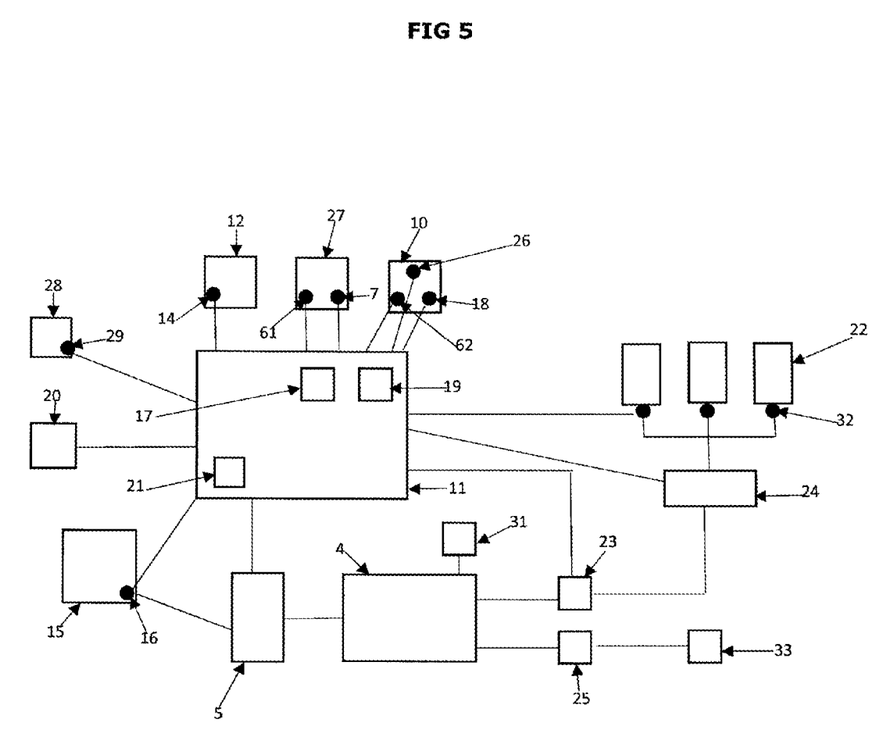
FIG. 5 is a block diagram showing some of the elements of the cherry picker.

The lowered position of the arm, as illustrated in FIG. 3, in which the arm is fully lowered and folded, and the platform 8 is located close to the ground, is known as the transport configuration of the cherry picker, while the raised position of the arm, as illustrated in FIG. 4, in which the lifting arm 91 is extended and the platform 8 is distant from the ground, is known as the working configuration of the cherry picker.

The position sensors 32 are therefore capable of detecting at least the working configuration of the cherry picker 1 and sending this data to the drive unit 11.

It must be noted that in the case of a telescopic arm, the transport configuration of the cherry picker corresponds, in addition to the lowered position of the arm, to the retracted position of the telescope.

The cherry picker 1 further comprises, as mentioned above, a drive unit 11. Said drive unit 11 takes the form of an electronic computer system that comprises for example a microprocessor and a working memory. According to one particular aspect, the drive unit can take the form of a programmable logic controller.

In other words, the functions and steps described can be implemented in the form of a computer program or via hardware components (for example field programmable gate arrays). In particular, the functions and steps performed by the drive unit or the modules thereof can be carried out by sets of instructions or computer modules implemented in a processor or controller, or carried out by dedicated electronic components or FPGA or ASIC components. It is also possible to combine computing parts and electronic parts.

When it is stated that the unit or means or modules of said unit are configured to perform a given operation, this means that the unit comprises computing instructions and corresponding execution means that make it possible to perform said operation, and/or that the unit comprises corresponding electronic components.

This drive unit 11 is capable of receiving input data and transmitting output data. This drive unit 11 is configured to control the elevation means 9, and preferably the movement means 3, as a function of the data supplied by the control panel 10 arranged on the platform.

In the example shown, the cherry picker comprises, in addition to the control panel 10, a control station 27 mounted on the chassis and known as the ground control station 27. This second control station 27 makes it possible to assist an operator in difficulties on the platform and to perform operations on the cherry picker without having to get up onto the platform 8.

The cherry picker 1 further comprises a member for powering up the drive unit 11. This power-up member 7 is capable of switching from an inactive state to an active state, and vice versa. Here, this member 7 for powering up the cherry picker takes the form of an ignition key arranged on the control station 27 on the chassis 2. This key is a turning key capable of switching, by turning, from an inactive state to an active state, and vice versa. The switching of the key to the active position powers up at least the drive unit 11.

This ground control station 27 is also provided with one of the members for actuating the starter 5 as described above. Here, this member 61 for actuating the starter 5 consists of a simple starting button. This ground control station 27 can further be provided with controls for moving the arm and the chassis. The drive unit 11 is also configured to control the elevation means 9 and the movement means 3 as a function of the data supplied by the ground control station 27.

This ground control station 27 is also provided with a member 18 that can be activated/deactivated for controlling the cold starting of the internal combustion engine 4. This member 18 takes the form of a button that can be activated by manual actuation and deactivated automatically either after a predetermined activation period or when, for example, the temperature of the oil in one of the hydraulic circuits, such as the oil in the elevation means or movement means circuits, reaches a predetermined temperature.

This cold start control member 18 enables the operator to know when the cherry picker 1 is capable of optimum operation of the internal combustion engine 4.

A module 19 for determining the activated state of the cold start control member 18 is provided on the drive unit 11. This module makes it possible for the drive unit 11 to have information relating to the activated state of the cold start control member 18.

The control panel 10 is in turn provided with the second member 62 for actuating the starter 5 for the internal combustion engine 4. This member 62 for actuating the starter 5 for the internal combustion engine 4 can be used, for example, on a cold start of the engine or after a switch-off triggered following the actuation of an emergency stop button provided on the panel, the actuation of said emergency stop button generating the switching off of the internal combustion engine and the disconnection of power to a large number of electrical members provided on the cherry picker.

The control panel 10 further comprises a control or controls 26 in the form of levers also known as joysticks. It will be understood that one control can include several control members. The control or controls 26 comprise a control for at least the elevation means 9 that makes it possible to control the elevation of the platform 8 by means of the internal combustion engine 4. Provision can be made for the control or controls 26 to comprise only a control for the elevation means 9, or a control for the means 9 for elevating the platform 8 and a control for the movement means 3 for controlling the movement of the wheels. It is thus possible, from the control panel, to control only the lifting of the arm, or the lifting and the movement of the vehicle over the ground. The number of levers can therefore be variable. For example, a first lever for actuating the lifting of the lifting arm 91, a second lever for controlling forward/reverse movement of the rolling chassis and, if the arm is mounted on a pivoting turret of the chassis 2, as in the example shown, a third lever for controlling the rotation of the turret, can be provided. All of the movements of these levers can be measured by transducers and supplied to the drive unit 11 in the form of electrical signals. As a variant, the second and third levers can be eliminated.

As a further variant, the platform elevation means 9 and the means 3 for moving the chassis over the ground can be controlled by means of the same lever.

The platform 8 further comprises a member 12 for activating/deactivating at least the control 26 for the platform elevation means 9 on the control panel. Hereinafter, for the sake of simplicity, reference is made to the activation/deactivation member 12.

According to one particular aspect, said activation/deactivation member 12 not only makes it possible to activate/deactivate at least the control for the platform elevation means 9, but also to activate/deactivate the control for the means 3 for moving the chassis over the ground, when this control is present on the control panel.

This activation/deactivation member 12 for at least the control 26 for the elevation means 9 and, optionally, for the control for the means 3 for moving the chassis over the ground, when present, is mounted so that it can be moved between an inactive position in which the control or controls 26 of the control panel 10, i.e. at least the control 26 for the elevation means 9 or at least the control 26 for the elevation means 9 and the control 26 for the means 3 for moving the chassis over the ground, are deactivated or inactive, and an active position in which the control or controls 26 of the control panel 10, i.e., again, at least the control 26 for the elevation means 9 or at least the control 26 for the elevation means 9 and the control 26 for the means 3 for moving the chassis over the ground, are activated or active. Deactivated is given to mean that an action of the operator on the control or controls has no effect, and the control order is not transmitted to the drive unit 11. Conversely, activated is given to mean that an action of the operator on the control or controls is capable of being transmitted to the drive unit 11.

This activation/deactivation member 12 is provided with means 13 for returning it to the inactive position and is capable of switching from the inactive position to the active position under the action of thrust exerted on said activation/deactivation member 12 against the return means 13. These return means 13 can consist of a spring or any other elastically deformable means.

In the examples shown, the activation/deactivation member 12 is a foot pedal held by the platform 8. This pedal is arranged on the floor of the platform 8 at a distance from the control panel 10, which is placed at the height of the operator's hands.

The operator can thus actuate the pedal when their hands are being used for work at height. This pedal is provided with an indicator 14 for indicating the active or inactive position of the pedal, the position data from said indicator being transmitted to the drive unit 11.

This active or inactive position indicator 14 can consist of a simple switch arranged on the pedal or a transducer capable of measuring the movement of the pedal and supplying information about the movement of the pedal to the drive unit in the form of electrical signals.

The cherry picker further comprises means 31 for transmitting an audible signal, such as a siren, and/or means for transmitting a light signal, such as a flashing light, as in the example shown.

These means 31 can be activated/deactivated and can be activated as a function of the operating conditions of the cherry picker.

As the description above illustrates, the drive unit 11 is therefore capable of receiving input data that can particularly be logical information relating to starting, switching off, extinguishing, ignition, and lifting, or measurements from the sensors, and of transmitting output data that can be control instructions for the actuators, and light or other indicator information, this input and output data depending on the operating mode of the cherry picker.

In the working configuration of the cherry picker in one operating mode, the drive unit 11 is configured to cause the powered switching off of the internal combustion engine 4, i.e. to cause, in the activated state of the power-up member 7 and the started state of the internal combustion engine 4, the switching off of the internal combustion engine 4 with the power-up member 7 remaining activated, and in this operating mode, known as the economical operating mode, once the internal combustion engine 4 has been switched off with power, the drive unit is configured to control the starting of the internal combustion engine 4 by means of the activation/deactivation member 12 without actuation of the members 61 and 62 for actuating the starter. The powered switching off of the engine makes it possible to retain a power supply to the drive unit. Starting takes place by switching the activation/deactivation member 12 from the inactive position to the active position.

This starting of the internal combustion engine 4 can depend, for safety reasons, on the checking of the closed state of the cover 28. This check takes place by means of the position sensor 29 of the cover 28 described above.

Figure 7:
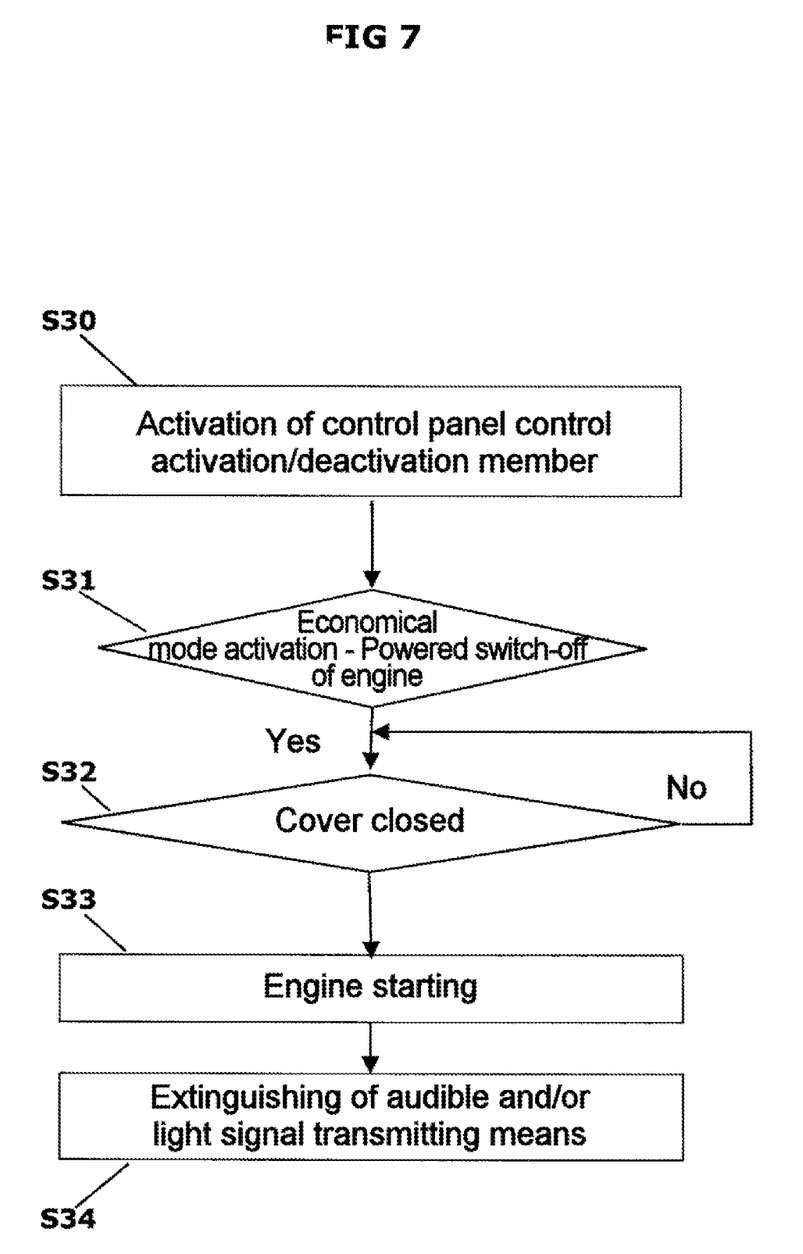
FIG. 7 is a flow chart showing the procedure for starting the internal combustion engine when the member for activating/deactivating one or more controls of the control panel is switched from the inactive position to the active position.

The steps of starting the internal combustion engine 4 by means of the activation/deactivation member 12 are thus summarized in FIG. 7 and can comprise a step S30 during which the activation/deactivation member 12 is activated, i.e. moved from the inactive position to the active position; in step S31, a check is carried out to ascertain that the operating mode is the economical operating mode and that the internal combustion engine 4 is switched off with power.

It must therefore be noted that the economical operating mode can be activated by default in the started state of the engine on the first starting of the engine, or be capable of being activated by means of a mode selection button arranged on the ground control station or on the control panel. Two members for activating the economical operating mode can also be provided, one on the control panel, the other on the control station.

In step S32, a check is carried out to ascertain whether the cover 28 is closed. If the cover is closed then the internal combustion engine is started in step S33, and in step S34 the means for transmitting the audible and light signals that might have been activated on the powered switching off of the engine are extinguished.

As mentioned above, in this economical operating mode, the drive unit 11 is configured to cause the powered switching off of the internal combustion engine 4. The cherry picker therefore comprises means for establishing a request to activate the powered switching off of the internal combustion engine on the basis of request criteria of the vehicle, and the drive unit 11 is configured to control this powered switch-off when the request is established. These request criteria are selected, as illustrated in the description below, from the group comprising at least:
- a criterion representing the charge level of the battery,
- a criterion representing the deactivation of the cold start control member 18,
- a criterion representing the deactivation of the electricity generator 20,
- a criterion representing the cherry picker in the working configuration,
- a criterion representing the presence of an operator on the platform,
- a criterion representing the position of the activation/deactivation member 12,
- a criterion representing the closed position of the cover 28.

Here, these criteria apply cumulatively. However, the number of criteria can be reduced as a function of the desired level of safety or comfort. The criterion relating to the deactivation of the starting control member and the criterion relating to the deactivation of the electricity generator can thus be eliminated.

The drive unit is therefore configured, in the working configuration of the cherry picker, in the activated state of the economical operating mode, to control the powered switching off of the internal combustion engine 4 at least as a function of the data supplied by the position indicator 14 of the activation/deactivation means 12, the drive unit being configured to control the powered switching off of the engine at least if the activation/deactivation member is in the inactive position.

Similarly, the drive unit is configured, in the working configuration of the cherry picker, in the activated state of the economical operating mode, to control the powered switching off of the internal combustion engine 4 at least as a function of the present or absent state determined by the presence determination module 17, the drive unit being configured to control the powered switching off of the engine at least if the present state is detected. This presence determination module 17 arranged on the drive unit is configured to check that the last instructions received for controlling the engine or the lifting arm originate from the control panel.

Optionally, the drive unit is configured, in the working configuration of the cherry picker, in the activated state of the economical operating mode, to control the powered switching off of the internal combustion engine 4 as a function of the activated/deactivated state of the member 18 for controlling the cold starting of the internal combustion engine, the drive unit being configured to control the powered switching off of the internal combustion engine 4 at least if the control member 18 is in the deactivated state.

Similarly, optionally, the drive unit is configured, in the working configuration of the cherry picker, in the activated state of the economical operating mode, to control the powered switching off of the internal combustion engine 4 at least as a function of the open/closed state of the cover 28 detected by the detector 29 and supplied to the drive unit, the drive unit being configured to control the powered switching off at least if the cover is in the closed state.

Finally, again optionally, the drive unit is configured, in the working configuration of the cherry picker, in the activated state of the economical operating mode, to control the powered switching off of the internal combustion engine 4 at least as a function of the data supplied by the module 21 for determining the activated/deactivated state of the electricity generator 20, the drive unit being configured to control the powered switching off at least if the electricity generator 20 is in the deactivated state.

In order to enable the powered switching off of the internal combustion engine 4 in this economical operating mode, when this economical operating mode is an operating mode that can be activated/deactivated, this operating mode must be activated. Activation can take place automatically after the powering up and first starting of the engine. It can also be controlled by the operator by means of a button.

However, this activation/deactivation depends on the charge level of the battery and the economical operating mode can be deactivated when the charge level of the battery 15 supplied by the charge level indicator 16 is insufficient.

Figure 6:
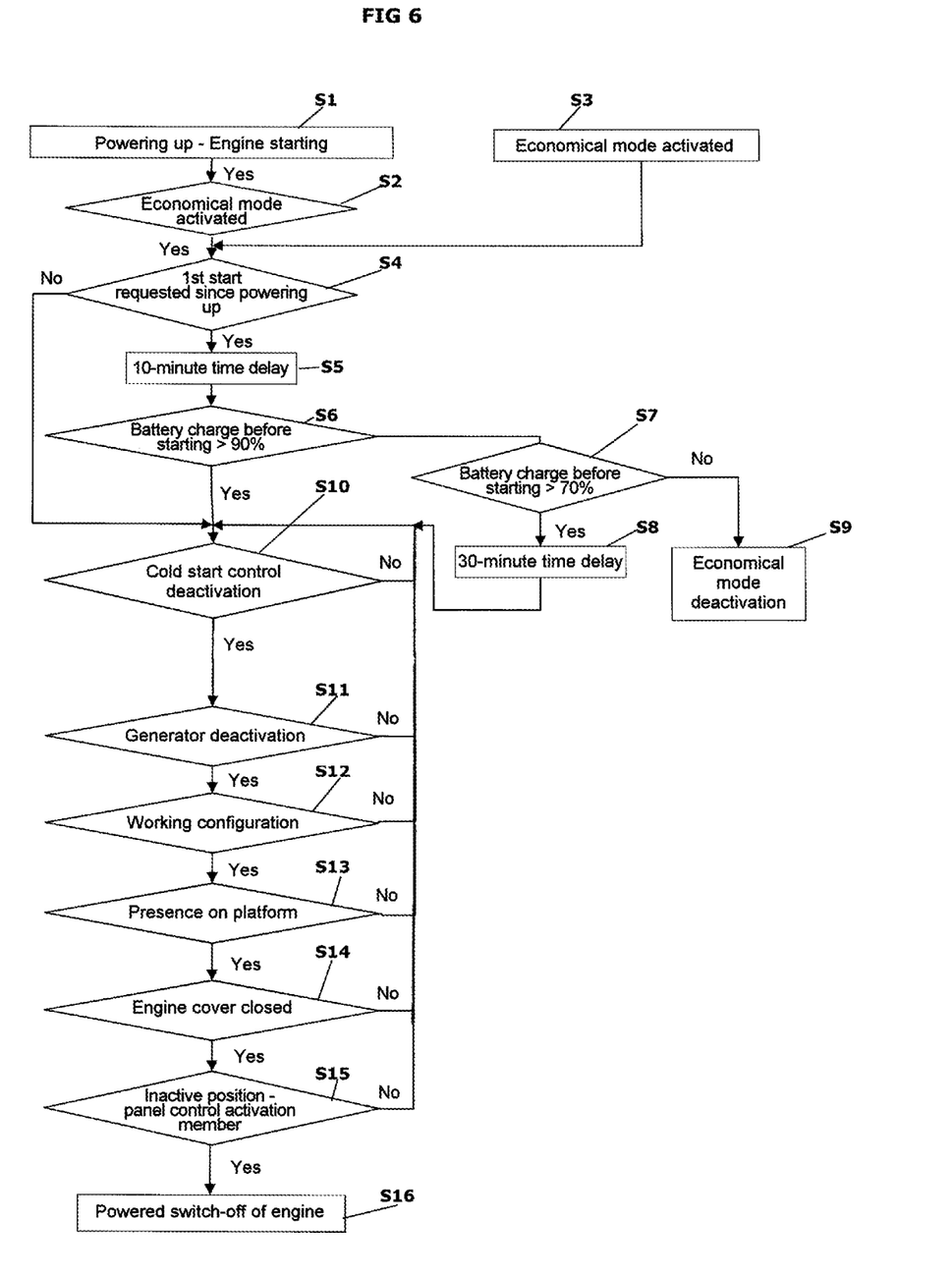
FIG. 6 is a flow chart showing the procedure for switching off the internal combustion engine in the working configuration of the cherry picker.

In economical operating mode, the steps followed for a powered switch-off of the engine can thus correspond to those shown in FIG. 6.

In step S1, the cherry picker is thus powered up by actuation of the power-up member 7 and the engine is started by means of one of the members 61, 62 for actuating the starter.

In step S2, a test to check the activation of the economical operating mode is carried out. If the operating mode is activated, this means that it might have remained activated following a previous operation of the cherry picker. If this is not the case, this economical operating mode can be activated manually by the operator in step S3 by actuation of a button.

In step S4, a check is carried out to ascertain whether a first start has been requested since power-up. If a first start has already been carried out, a time delay is put in place in step S5, and in step S6, once the time delay has ended, the battery charge level that is taken before starting is compared to a threshold value. If this battery charge level is less than 90%, a test is then carried out in a step S7 to ascertain whether the battery charge level before starting is greater than 70%. If this is not the case, the economical operating mode is deactivated in a step S9. If the battery charge level is greater than 70%, a time delay is introduced in step S8 that enables, due to the fact that the engine is running, an increase in the battery charge level.

All of the steps mentioned above thus make it possible to check that the battery charge level is sufficient. It is then possible to envisage a powered switch-off of the engine. To this end, a certain number of test steps, represented by steps S10 to S15, are carried out. The following are thus tested:
in step S10, whether the cold start control is deactivated,
in step S11, whether the generator is deactivated,
in step S12, whether the working configuration is activated,
in step S13, whether a presence on the platform is confirmed,
in step S14, whether the cover is closed,
and in step S15, whether the activation/deactivation member 12 is in the inactive position,
if all of these conditions are met, then the powered switch-off of the engine is controlled by the drive unit in step S16.

Once the powered switch-off of the engine has been achieved in step S16, in this economical operating mode, the internal combustion engine can be started by implementing steps S30 to S34 in FIG. 7 as described above.

In this economical operating mode, it is also possible, in the powered switched-off state of the internal combustion engine 4, to control the automatic starting of the internal combustion engine 4 to avoid the discharging of the battery. These steps for automatically starting the internal combustion engine are described in FIG. 8.

Figure 8:
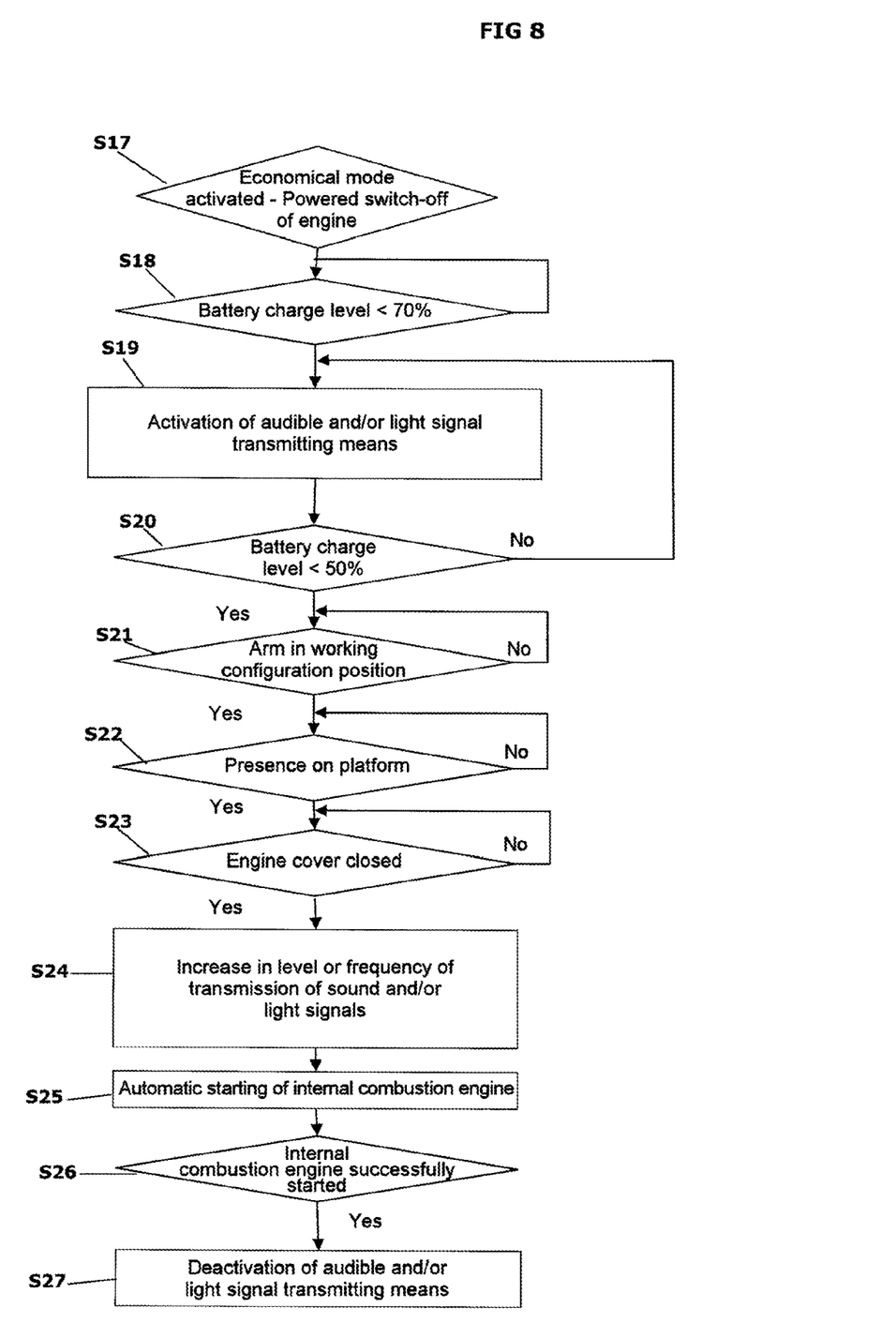
FIG. 8 is a flow chart showing the procedure for the automatic starting of the internal combustion engine in the working configuration of the cherry picker.

In step S17, a test is carried out to ascertain whether the economical mode is activated and whether the engine is switched off with power.

If the test is positive, the method moves on to step S18, in which the battery charge level is tested by means of the charge level indicator 16. If this charge level is greater than 70%, then in a step S19, the means for transmitting audible and/or light signals are activated to indicate to the operator that the battery is discharging.

In a step S20, the battery charge level is tested again. If this charge level is less than 50%, then in a step S21, a check is carried out to ascertain whether the lifting arm is in the working configuration and, in a step S22, whether an operator is present on the platform, and in step S23, whether the engine cover is closed.

If all of these conditions are met, then in step S24, the level or frequency of the transmission of the audible and/or light signals is increased, and in step S25, the internal combustion engine is started automatically.

In step S26, a test is carried out to ascertain whether the internal combustion engine has started. If so, in a step S27, the means for transmitting audible and/or light signals are deactivated. The cycle of steps S10 to S16, as described in FIG. 6, resulting in a powered switch-off of the engine, can be performed again when the battery charge level is sufficient.

The invention claimed is:

1. A cherry picker comprising:
a chassis,
an internal combustion engine, a starter for said internal combustion engine and at least one member for actuating the starter,
a platform,
means for elevating the platform relative to the chassis, said elevation means comprising at least one telescopic or non-telescopic lifting arm arranged between a zone for connection to the platform and the chassis and mounted so that it can be moved by means of the internal combustion engine between a raised position and a lowered position,
a control panel held by said platform and provided at least with a control for the elevation means, and
a drive unit configured to control the elevation means as a function at least of the data supplied by said control panel,
a member for powering up at least the drive unit, said power-up member being capable of switching from an inactive state to an active state, and vice versa,
a member for activating/deactivating at least the control for the elevation means, said activation/deactivation member being mounted so that it can be moved between an inactive position in which at least the control for the elevation means is deactivated regardless of whether the internal combustion engine is switched off or on, and an active position in which at least the control for the elevation means is activated, said activation/deactivation member being provided with means for returning it to an inactive position and being capable of switching from the inactive position to the active position under the action of thrust exerted on said activation/deactivation member against the return means,
said cherry picker having two configurations, namely a transport configuration and a working configuration, said cherry picker being in transport configuration in the lowered position of the arm and in the retracted position of the arm in the case of a telescopic arm, wherein in the working configuration, the cherry picker comprises at least one operating mode in which the internal combustion engine is capable, in the activated state of the member for powering up the drive unit, and in the started state of the internal combustion engine, of being switched off, this switching off of the internal combustion engine being known as a powered switch-off of the internal combustion engine, and in which, in the powered switched-off state of said internal combustion engine, the drive unit is configured to control the starting of the internal combustion engine by means of the member for activating/deactivating at least the control for the elevation means, by switching the activation/deactivation member from the inactive position to the active position, without actuation of the member or members for actuating the starter.

2. The cherry picker as claimed in claim 1, wherein the starter for the internal combustion engine is powered by a battery capable of being recharged when the internal combustion engine is running, and in that the cherry picker comprises a charge level indicator of the battery and in that, in the working configuration of the cherry picker, the cherry picker comprises an operating mode in which said drive unit is configured, in the powered switched-off state of the internal combustion engine, to control the automatic starting of the internal combustion engine at least as a function of the data supplied by the charge level indicator.

3. The cherry picker as claimed in claim 2, wherein in the operating mode known as the economical operating mode in which, in the powered switched-off state of said internal combustion engine, the drive unit is capable of controlling the starting of the internal combustion engine by means of the activation/deactivation member, by switching said activation/deactivation member from the inactive position to the active position, the drive unit is also configured, in the powered switched-off state of the internal combustion engine, to control the automatic starting of the internal combustion engine at least as a function of the data supplied by the charge level indicator, this economical operating mode being a mode that can be activated/deactivated, and the drive unit being configured to deactivate the economical operating mode at least as a function of the data supplied by the charge level indicator.

4. The cherry picker as claimed in claim 1, wherein the cherry picker comprises an indicator of the active/inactive position of the member for activating/deactivating at least the control for the elevation means and in that, in the working configuration of the cherry picker, in the operating mode in which, in the powered switched-off state of said internal combustion engine, the activation/deactivation member is capable, by switching from the inactive position to the active position, of controlling the starting of the internal combustion engine, the drive unit is configured to control the powered switching off of the internal combustion engine at least as a function of the data supplied by said position indicator.

5. The cherry picker as claimed in claim 1, wherein the drive unit comprises a presence determination module configured to determine the present or absent state of a person on the platform as a function of data supplied by the control panel and in that, in the working configuration of the cherry picker, in the operating mode in which, in the powered switched-off state of said internal combustion engine, the activation/deactivation member is capable, by switching from the inactive position to the active position, of controlling the starting of the internal combustion engine, the drive unit is configured to control the powered switching off of the internal combustion engine at least as a function of said state determined by the presence determination module.

6. The cherry picker as claimed in claim 1, wherein the cherry picker comprises a member that can be activated/deactivated for controlling the cold starting of the internal combustion engine and a module for determining the activated/deactivated state of said control member, this control member being able to be activated by manual actuation and deactivated automatically and in that, in the working configuration of the cherry picker, in the operating mode in which, in the powered switched-off state of said internal combustion engine, the member for activating/deactivating at least the control for the elevation means is capable, by switching from the inactive position to the active position, of controlling the starting of the internal combustion engine, the drive unit is configured to control the powered switching off of the internal combustion engine at least as a function of the activated/deactivated state of said cold start control member determined by said module.

7. The cherry picker as claimed in claim 1, wherein the cherry picker comprises at least one electricity generator, and a module for determining the activated/deactivated state of said electricity generator and in that, in the working configuration of the cherry picker, in the operating mode in which, in the powered switched-off state of said internal combustion engine, the activation/deactivation member is capable, by switching from the inactive position to the active position, of controlling the starting of the internal combustion engine, the drive unit is configured to control the powered switching off of the internal combustion engine at least as a function of the activated/deactivated state of the electricity generator determined by said module.

8. The cherry picker as claimed in claim 1, wherein the cherry picker comprises a protective cover for the internal combustion engine held by the chassis and a detector for detecting the open/closed state of the cover and in that, in the working configuration of the cherry picker, in the operating mode in which, in the powered switched-off state of said internal combustion engine, the activation/deactivation member is capable, by switching from the inactive position to the active position, of controlling the starting of the internal combustion engine, the drive unit is configured to control the starting of the internal combustion engine at least as a function of the open/closed state of the cover.

9. The cherry picker as claimed in claim 1, wherein the cherry picker comprises means for transmitting an audible and/or light signal and in that, in the working configuration of the cherry picker, in the operating mode in which, in the powered switched-off state of said internal combustion engine, the activation/deactivation member is capable, by switching from the inactive position to the active position, of controlling the starting of the internal combustion engine, the drive unit is configured to control the actuation of the transmission means in the powered switched-off state of said internal combustion engine.

10. The cherry picker as claimed in claim 1, wherein said activation/deactivation member is a foot pedal held by said platform.

11. The cherry picker as claimed in claim 1, wherein the member for powering up the cherry picker is a key arranged on the chassis, this key being a turning key capable of switching by turning from an inactive state to an active state, and vice versa.

12. The cherry picker as claimed in claim 1, wherein in the operating mode known as the economical operating mode in which, in the powered switched-off state of said internal combustion engine, the drive unit is capable of controlling the starting of the internal combustion engine by means of the member for activating/deactivating at least the control for the elevation means, by switching the activation/deactivation member from the inactive position to the active position, without actuation of the member or members for actuating the starter, the drive unit is configured, in the started state of the internal combustion engine, to control the powered switching off of the internal combustion engine at least if the member for activating/deactivating at least the control for the elevation means is in the inactive position.

13. The cherry picker as claimed in claim 1, wherein the chassis is provided with a control station and the or one of the members for actuating the starter is a starting button provided on said station.

14. The cherry picker as claimed in claim 1, wherein the chassis is provided with wheels, the internal combustion engine is connected to the wheels by means of a transmission in order to form means for moving the chassis over the ground;

and in that the control panel held by said platform is also provided at least with a control for the means for moving the chassis over the ground, and in that the drive unit is also configured to control the means for moving the chassis over the ground as a function at least of the data supplied by said control panel, and in that said activation/deactivation member is also configured, in the active position, to activate the control for the means for moving the chassis over the ground, and in the inactive position, to deactivate the control for the means for moving the chassis over the ground.

15. A method for controlling a cherry picker comprising:
a chassis,
an internal combustion engine, a starter for said internal combustion engine and at least one member for actuating the starter,
a platform,
means for elevating the platform relative to the chassis, said elevation means comprising at least one telescopic or non-telescopic lifting arm arranged between a zone for connection to the platform and the chassis and mounted so that it can be moved by means of the internal combustion engine between a raised position and a lowered position, a control panel held by said platform (8) and provided at least with a control for the elevation means, and
a control unit configured to control the elevation means as a function at least of the data supplied by said control panel,
a member for powering up at least the drive unit, said power-up member being capable of switching from an inactive state to an active state, and vice versa,
a member for activating/deactivating at least the control for the elevation means, said activation/deactivation member being mounted so that it can be moved between an inactive position in which the control for the elevation means is deactivated regardless of whether the internal combustion engine is switched off or on, and an active position in which the control for the elevation means is activated, said activation/deactivation member being provided with means for returning it to an inactive position and being capable of switching from the inactive position to the active position under the action of thrust exerted on said activation/deactivation member against the return means,
said cherry picker having two configurations, namely a transport configuration and a working configuration, said cherry picker being in transport configuration in the lowered position of the arm and in the retracted position of the arm
in the case of a telescopic arm,
wherein in the working configuration of the cherry picker, in at least one operating mode in which the internal combustion engine is capable, in the activated state of the member for powering up the drive unit, and in the started state of the internal combustion engine, of being switched off, this switching off of the internal combustion engine being known as a powered switch-off of the internal combustion engine, the method comprises a step of starting the internal combustion engine by means of the member for activating/deactivating at least the control for the elevation means, by switching the activation/deactivation member from the inactive position to the active position, without actuation of the member or members for actuating the starter.

* * * * *